(12) United States Patent
Tsai

(10) Patent No.: US 8,296,997 B2
(45) Date of Patent: Oct. 30, 2012

(54) UPRIGHT PLANTING APPARATUS

(76) Inventor: Yi-Chen Tsai, Chiayi (TW)

( * ) Notice: Subject to any disclaimer, the term of this patent is extended or adjusted under 35 U.S.C. 154(b) by 92 days.

(21) Appl. No.: 12/904,638

(22) Filed: Oct. 14, 2010

(65) Prior Publication Data
US 2011/0088318 A1  Apr. 21, 2011

(30) Foreign Application Priority Data

Oct. 20, 2009 (TW) .............................. 98135418 A

(51) Int. Cl.
*A01G 9/02* (2006.01)
(52) U.S. Cl. ............................................ 47/65.9; 47/83
(58) Field of Classification Search ............ 47/64, 62 R, 47/62 N, 65.5, 65.7, 65.9, 66.6, 67, 79, 82, 47/83; *A01G 31/02, 31/06, 9/02, 27/00, 27/02, A01G 27/04*
See application file for complete search history.

(56) References Cited

U.S. PATENT DOCUMENTS

| | | | | |
|---|---|---|---|---|
| 4,397,114 A * | 8/1983 | Skaife | ................................ | 47/81 |
| 4,435,918 A * | 3/1984 | Shain | ................................ | 47/79 |
| 5,363,594 A * | 11/1994 | Davis | ................................ | 47/82 |
| 6,109,011 A * | 8/2000 | Iyer et al. | ........................ | 56/239 |
| 8,001,723 B2 * | 8/2011 | Tamura et al. | .................... | 47/77 |
| 2007/0079551 A1* | 4/2007 | Tamura et al. | ................. | 47/65.5 |
| 2008/0110086 A1* | 5/2008 | Julia | ............................... | 47/64 |
| 2011/0148124 A1* | 6/2011 | Soejima | ........................ | 290/1 R |
| 2011/0252704 A1* | 10/2011 | Cho | ................................ | 47/66.6 |

FOREIGN PATENT DOCUMENTS

JP          05000032 A    *    1/1993

* cited by examiner

*Primary Examiner* — Son T Nguyen
*Assistant Examiner* — Shadi Baniani
(74) *Attorney, Agent, or Firm* — Frommer Lawrence & Haug LLP; Ronald R. Santucci

(57) ABSTRACT

An upright planting apparatus includes a row of juxtaposed mesh pipe units disposed uprightly and a fixing unit. Each of the mesh pipe units includes an outer mesh pipe, and a liquid supply pipe. The outer mesh pipe has an upright tubular wall formed with a plurality of mesh holes extending through inner and outer surfaces of the upright tubular wall, and a groove that extends around said outer surface of the upright tubular wall to receive a plant culture medium. The liquid supply pipe is disposed axially inside the outer mesh pipe and has a plurality of liquid-seeping holes. The fixing unit fixes together the outer mesh pipes of the mesh pipe units.

10 Claims, 8 Drawing Sheets

UPRIGHT PLANTING APPARATUS

CROSS-REFERENCE TO RELATED APPLICATION

This application claims priority of Taiwanese Application No. 98135418, filed on Oct. 20, 2009, the disclosure of which is incorporated herein by reference.

BACKGROUND OF THE INVENTION

1. Field of the Invention

The invention relates to an apparatus for cultivating plants, and more particularly to an upright planting apparatus for cultivating plants at different levels.

2. Description of the Related Art

Potted plants are used for an esthetic visual effect in many places, such as park plazas, restaurant halls, house door steps, etc.

As shown in FIG. 1, a conventional upright planting apparatus 1 has a vertical wall body 1000 constructed by a plurality of vertically and horizontally splicing boxes 10 containing potting soil. A lateral side of the vertical wall body 1000 is dispersed with seeds or seedlings to build a greening wall dispersed by plantings.

However, this conventional upright planting apparatus 1 has several disadvantages as follows.

1) A huge amount of fixation components 11 are needed to assemble, fix and stabilize the vertically and horizontally splicing boxes 10. Therefore the assembly operation takes a long time and incurs additional cost.

2) To facilitate delivery of the boxes 10 filled with potting soil, each of the boxes 10 is provided with a width and a height both of which are 60 centimeters. When the width and height of the vertical wall body 1000 exceed 10 meters, the structure of the vertical wall body 1000 formed by the splicing boxes 10 may be unstable. Thus, practical size of the vertical wall body 1000 is limited.

3) Usually, water is poured from the top of the vertical wall body 1000 and seeps gradually into the potting soil in the boxes 10 from top to bottom. However, the plants in the lower layers of boxes receive little water, and it is difficult to appropriately control the water supplied to the plants. The plants may wither if insufficient water is supplied. If excess water is supplied, the water can overflow from the bottommost boxes 10, making the ground slippery.

SUMMARY OF THE INVENTION

Therefore, an object of the present invention is to provide an upright planting apparatus that is convenient in use and assembly.

According to one aspect of the invention, an upright planting apparatus includes a row of juxtaposed mesh pipe units disposed uprightly and a fixing unit. Each of the mesh pipe units includes an outer mesh pipe, and a liquid supply pipe. The outer mesh pipe has an upright tubular wall that is formed with a plurality of mesh holes extending through inner and outer surfaces of the upright tubular wall, and a groove that extends around said outer surface of the upright tubular wall and that is communicated fluidly with an interior of the upright tubular wall through said mesh holes. The liquid supply mesh pipe is disposed axially inside the outer mesh pipe and has a plurality of liquid-seeping holes. The fixing unit fixes together the outer mesh pipes of the mesh pipe units.

According to another aspect of the invention, a planting apparatus comprises: an outer mesh pipe having a tubular wall that is formed with a plurality of mesh holes extending through inner and outer surfaces of said tubular wall, and a rib that extends helically around said outer surface of said tubular wall and that defines a groove, which extends helically around said outer surface and which is communicated fluidly with an interior of said tubular wall through said mesh holes; a liquid supply pipe disposed axially inside said outer mesh pipe and having a plurality of liquid-seeping holes; and a solid culture medium filled in said groove and in a space within said tubular wall and around said liquid supply pipe.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
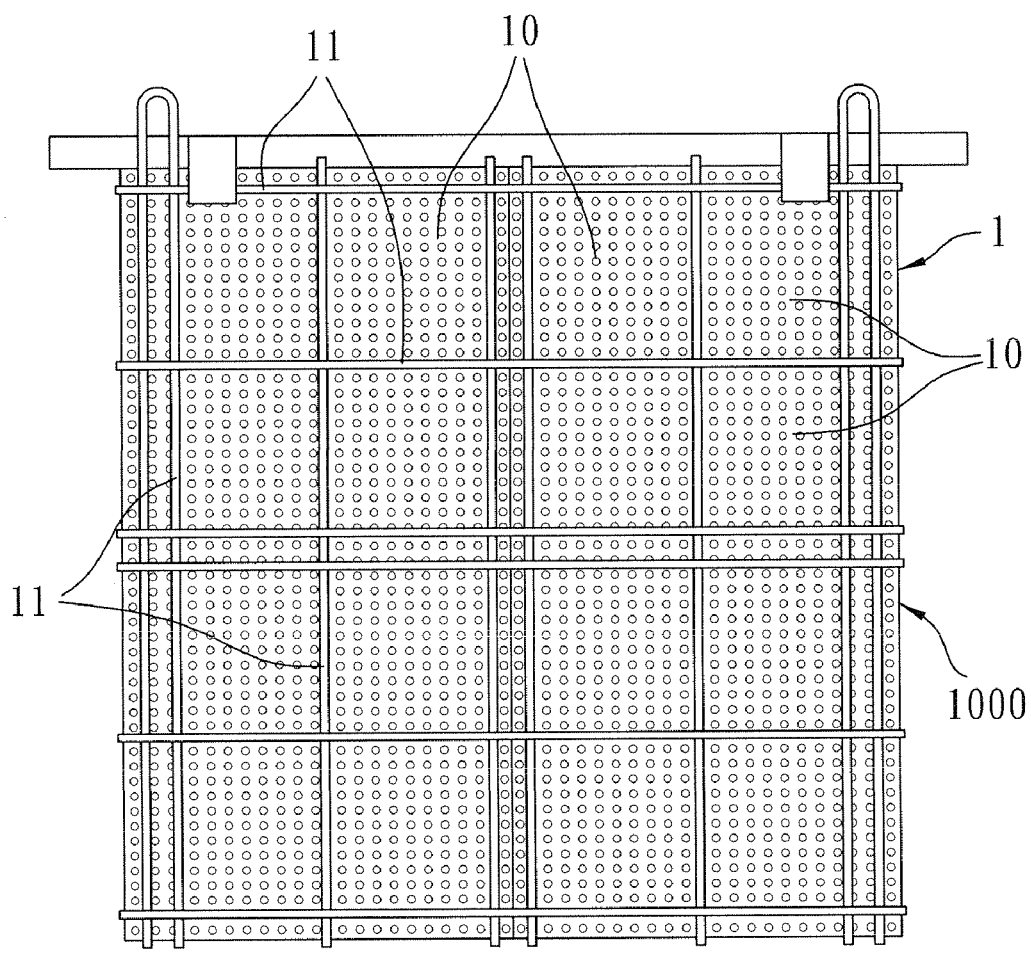
FIG. 1 is a front perspective view of a conventional upright planting apparatus.

Before the present invention is described in greater detail with reference to the accompanying preferred embodiments, it should be noted herein that like elements are denoted by the same reference numerals throughout the disclosure.

It should be noted herein that, the words 'upright' and 'vertical' in the following embodiments of this invention are not restricted to an exactly vertical state transverse to a horizontal plane, and are defined to include an inclined state with respect to a horizontal plane. Therefore, the upright planting apparatus may be used to construct a greening wall that is inclined relative to a horizontal plane. For convenience in illustration, this embodiment uses a vertical planar shape as an instance, but in practice this should not be imposed as an implementation limitation.

Referring to FIGS. 2 to 5, the first embodiment of an upright planting apparatus according to the present invention is shown to be mounted on a wall 100 to be filled with a plant culture medium 800 for planting (not shown in the FIGS. 2 to 5). The upright planting apparatus 1 comprises, a row of juxtaposed mesh pipe units 3 disposed uprightly. Each of the mesh pipe units 3 includes an outer mesh pipe 31, and a liquid supply pipe 32. The outer mesh pipe 31 has an upright tubular wall 311 that is formed with a plurality of mesh holes 312 extending through inner and outer surfaces of the upright tubular wall 311, and a groove 310 that extends around the outer surface of the upright tubular wall 311 and that communicates fluidly with an interior of the upright tubular wall 311 through the mesh holes 312. The liquid supply pipe 32 is disposed axially inside the outer mesh pipe 31 and has a plurality of liquid-seeping holes 320.

In this embodiment, each of the outer mesh pipes 31 has a sealed bottom. Each of the liquid supply pipes 32 also has a sealed bottom.

Preferably, each of the liquid supply pipes 32 contains a liquid-absorbing material 33 for absorbing a culture liquid such as water. The liquid-absorbing material 33 is used to absorb the liquid filled in the liquid supply pipe 32. The liquid-absorbing material 33 may be kept in a liquid-saturated state such that the liquid supply pipes 32 have a high level of water content that can be released gradually. The liquid-absorbing material 33 can be selected from the group including wood flour, various fibrous materials, and other water-absorbing materials.

In this embodiment, the groove 310 extends helically around the outer surface of the upright tubular wall 311. The outer mesh pipe 31 further has a rib 313 that extends helically around the outer surface and that defines the groove 310. The mesh holes 312 are in spatial communication with the groove 310.

Preferably, the outer mesh pipes 31 and the liquid supply pipes 32 are formed integrally from a plastic material, and may be formed with screen holes using a screen forming machine. The outer mesh pipes 31 and the liquid supply pipes 32 may be directly molded or tailored to a desired length according to the design of the height of the upright planting apparatus.

In this embodiment, the upright planting apparatus 1 further includes a liquid duct unit 5 that includes a liquid duct 51 for conveying culture liquid, and a plurality of branch pipes 52 connected to the liquid duct 51 for directing the culture liquid into the liquid supply pipes 32 respectively.

Figure 3:
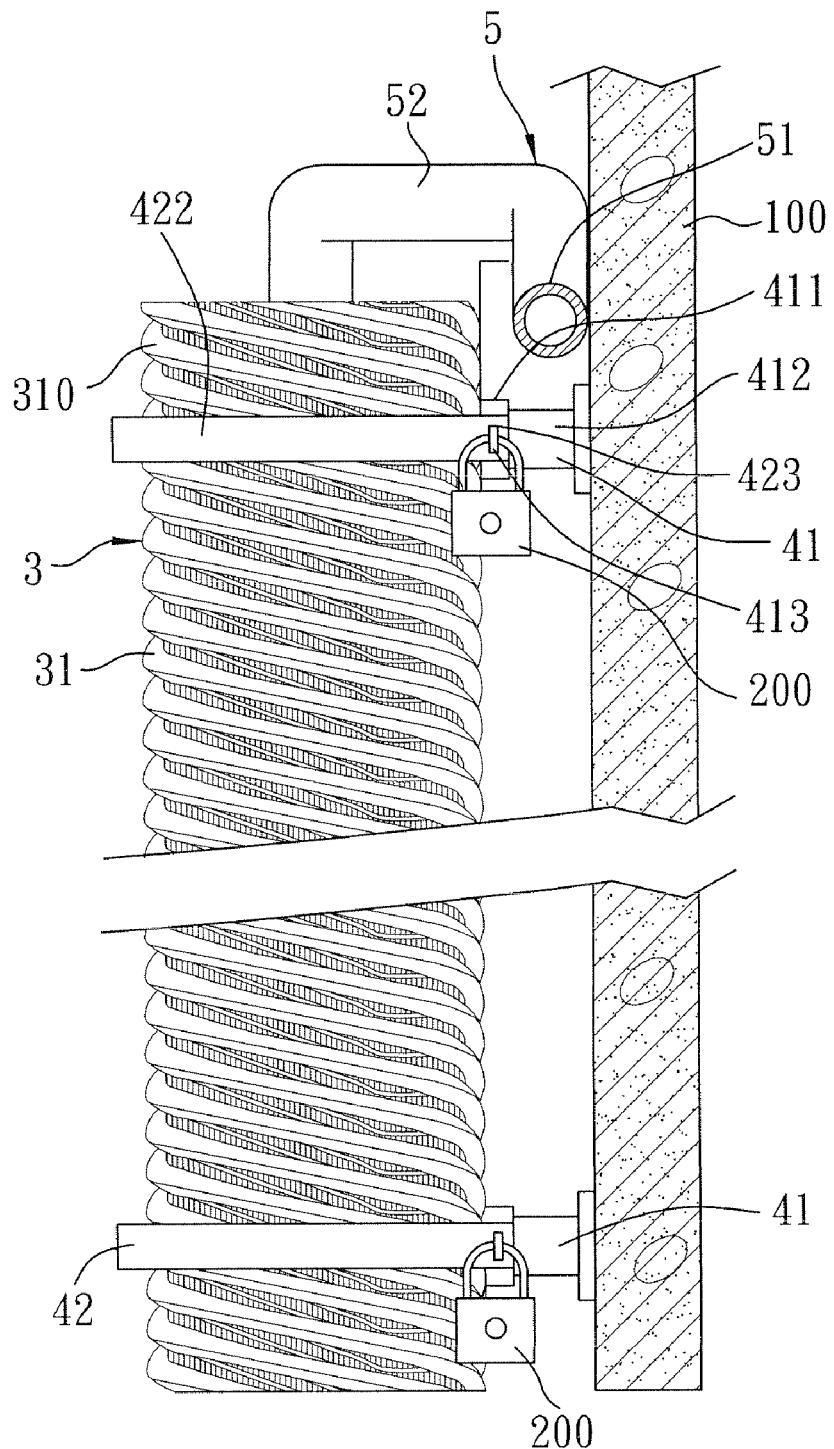
FIG. 3 is a right side partial perspective view of the first embodiment.
Figure 4:
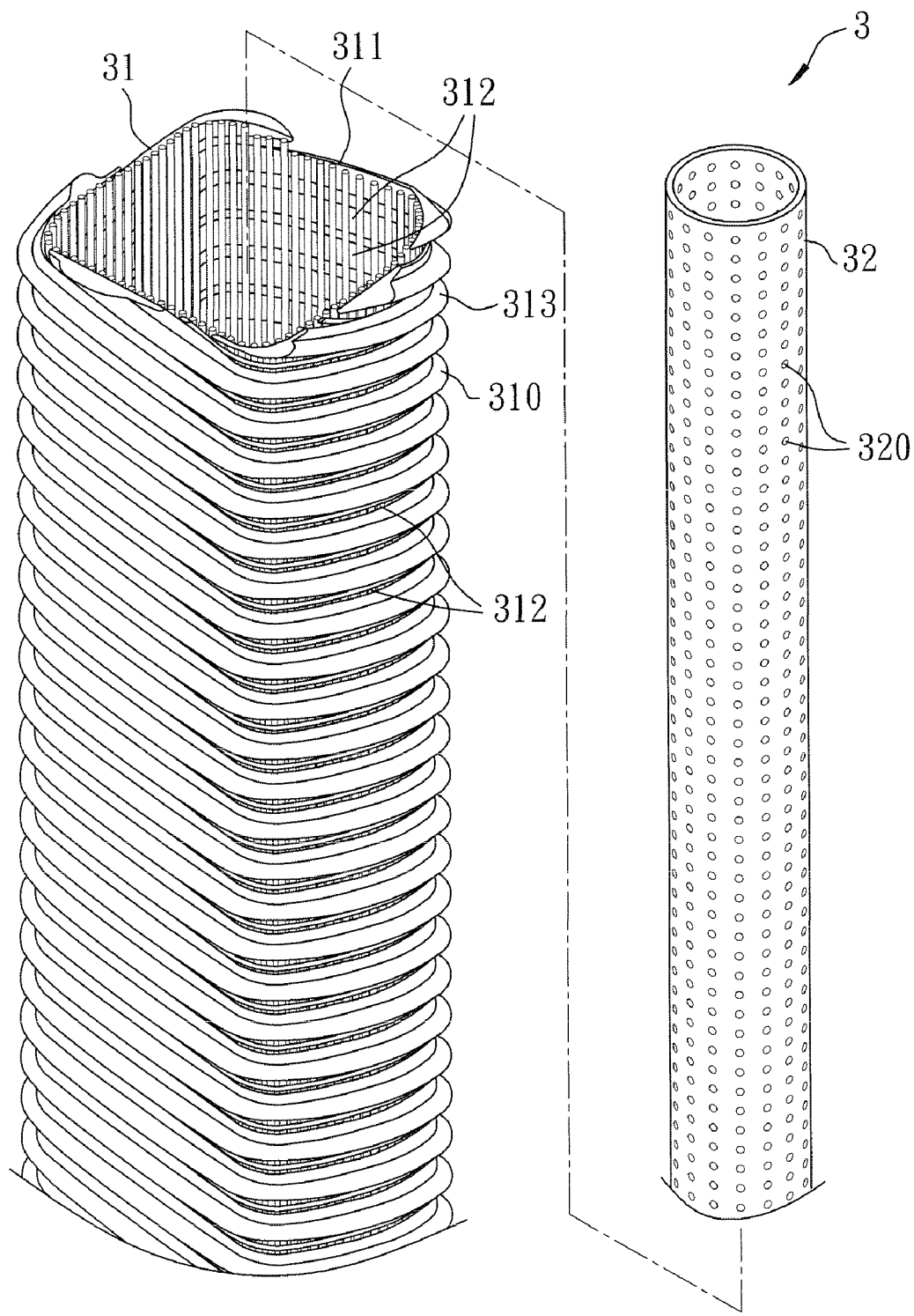
FIG. 4 is an exploded partial perspective view of a mesh pipe unit of the first embodiment.
Figure 5:
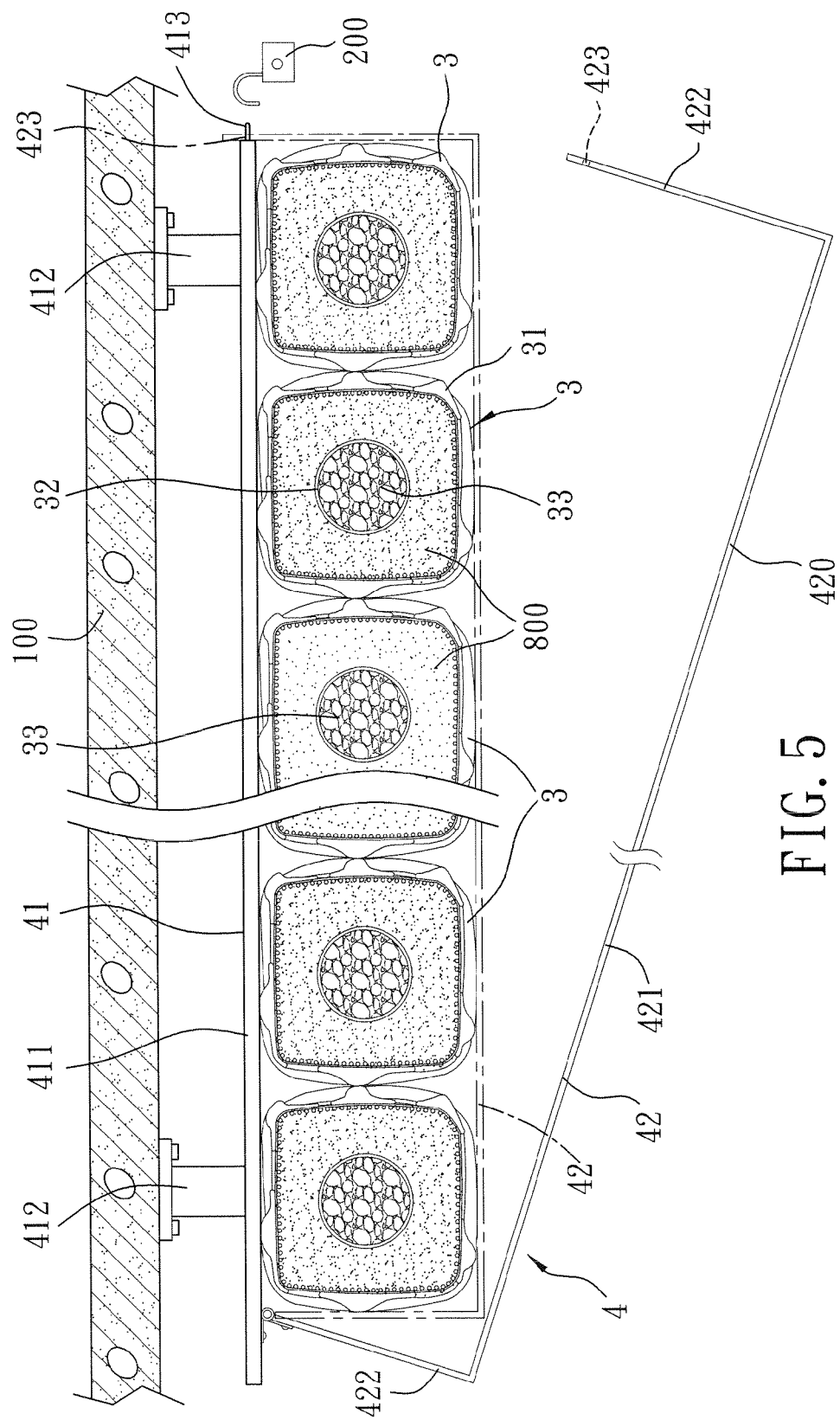
FIG. 5 is a partial top view of the first embodiment with a liquid duct unit being removed.

As shown in FIGS. 3 and 5, the upright planting apparatus further includes a pair of fixing units 4 for fixing together the mesh pipe units 3. One of the fixing units 3 fixes together upper portions of the mesh pipe units 3, and the other fixing unit 3 fixes together lower portions of the mesh pipe units 3.

Preferably, each of the fixing units 4 includes a fixation frame 41 abutting against the mesh pipe units 3 and adapted to be fixed to the wall 100 in a spaced apart position, and a positioning rod 42 mounted to the fixation frame and positioning the mesh pipe units 3 to the fixation frame 41. Particularly, the positioning rod 42 has a U-shape and is mounted pivotably to the fixation frame 41. The positioning rod 42 cooperates with the fixation frame 41 to embrace the mesh pipe units 3.

In this embodiment, the fixation frame 41 includes an elongate straight coupling rod 411, a pair of positioning legs 412, which are connected fixedly and respectively to two ends of the coupling rod 411 and which are mounted fixedly to the wall 100, and an engaging ring 413 protruding from one end of the coupling rod 411. The positioning rod 42 includes a limit section 421 for abutting against front sides of the outer mesh pipes 31 opposite to the coupling rod 411, and a pair of clasping sections 422, which extend transversely and respectively from two ends of the limit section 421 for abutting against two outermost ones of the outer mesh pipes 31. One of the clasping sections 422 is connected pivotably to the coupling rod 411 for pivoting relative to the fixation frame 41. The other one of the clasping sections 422 is formed with a coupling hole 423 for insertion of the engaging ring 413.

When the positioning rod 42 is pivoted toward the coupling rod 411 of the fixation frame 41, the positioning rod 42 cooperates with the fixation frame 41 to embrace the outer mesh pipes 31, and the engaging ring 413 extends through the coupling hole 423. A locking device 200 may be used to lock the engaging ring 413 fixedly to the coupling hole 423 so that the positioning rod 42 and the fixation frame 41 embrace the outer mesh pipes 31.

Figure 2:
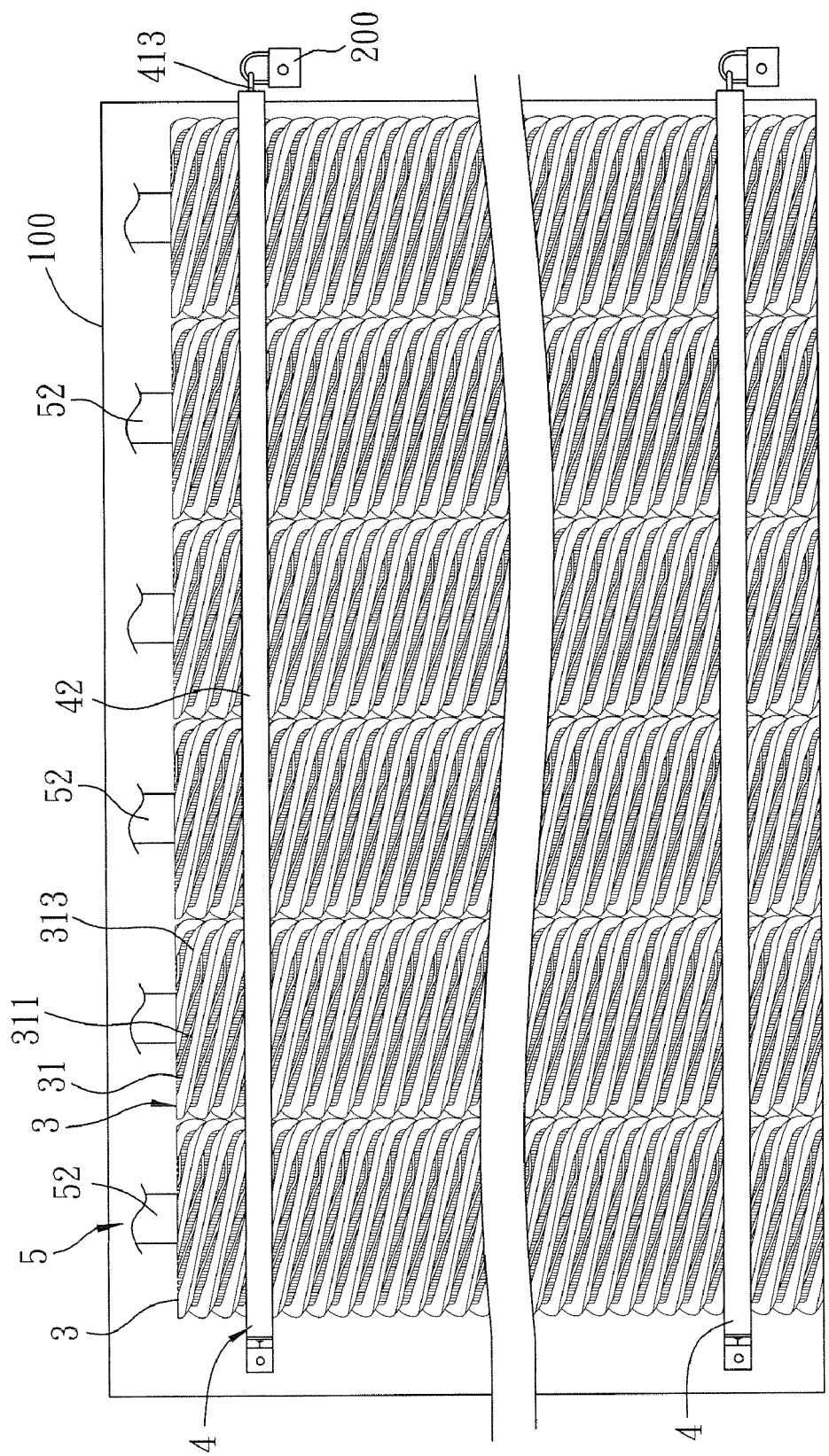
FIG. 2 is a front partial perspective view of the first preferred embodiment of an upright planting apparatus according to the present invention.
Figure 6:
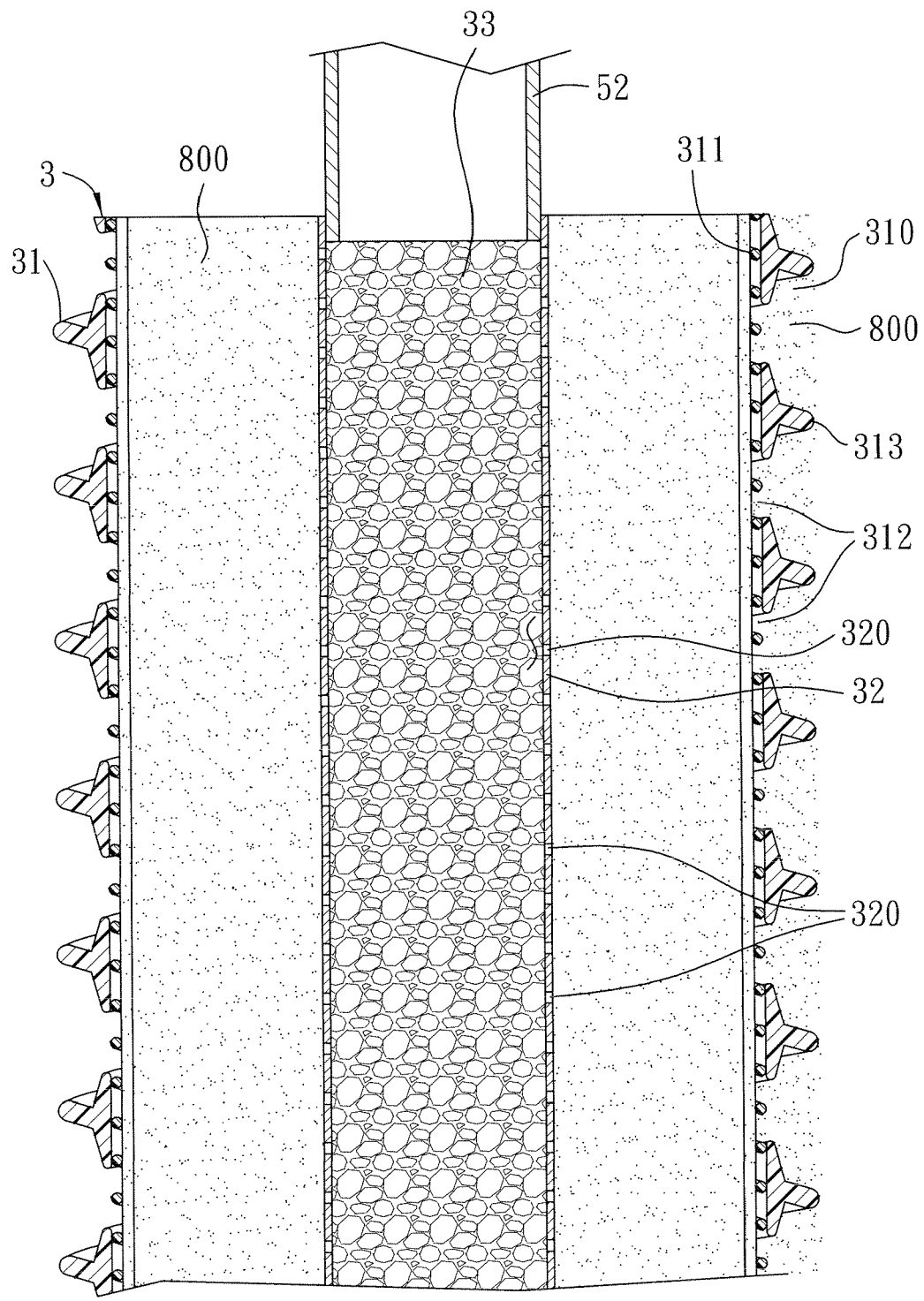
FIG. 6 is a side partial sectional view of the mesh pipe unit of the first embodiment.

As shown in FIGS. 2, 3 and 6, to construct a greening wall using the upright planting apparatus, first the fixation frames 41 of the fixing units 4 are mounted fixedly to the wall 100. Next, each of the outer mesh pipes 31 is filled with the plant culture medium 800, that is, the spaces 310 between the outer mesh pipes 31 and the liquid supply pipes 32 are filled with the plant culture medium 800. The plant culture medium 800 in this embodiment is culture soil. Then, the liquid supply pipes 32 are filled with the liquid-absorbing material 33. The outer mesh pipes 31 filled up by the plant culture medium 800 are set upright and are moved to abut against the coupling rods 411 of the fixation frames 41. In practice, steel wires (not shown in the Figures) can be used to extend through and tie the outer mesh pipes 31 to the fixation frames 41 so that the outer mesh pipes 31 are temporarily positioned relative to the fixation frames 41.

After the outer mesh pipes 31 filled with the plant culture medium 800 are juxtaposed and temporarily fixed to the fixation frames 41, the positioning rods 42 are moved toward the fixation frame 41 so that the limit sections 421 abut against the front sides of the outer mesh pipes 31. Then the clasping sections 422 are moved to abut against the outer lateral side of the two outermost outer mesh pipes 31, and the locking device 200 is used to lock the engaging ring 413 fixedly to the coupling hole 423 and to thereby lock the positioning rod 42 fixedly to the fixation frame 41.

In practice, the mesh pipe units 3 may be fixed together by the fixing units 4 before the plant culture medium 800 fills the outer mesh pipes 31.

After installation of the mesh pipe units 3 is completed, the branch pipes 52 are inserted into the upper portions of the liquid supply pipes 32 respectively.

Subsequently, the culture medium (culture soil) 800 is spread over the front, left and right lateral sides of each outer mesh pipe 31 such that the plant culture medium 800 is adhered to the outer surface of the outer mesh pipe 31 and contacts the plant culture medium 800 filled in the outer mesh pipes 31. The grooves 310 exposed at the outer surfaces of the outer mesh pipes 31 are thus filled with the plant culture medium 800. The ribs 313 protruding from the upright tubular walls 311 serve to support the plant culture medium 800. The thickness of the plant culture medium 800 is substantially equal to the protruding length of the ribs 313. Thereafter, according to the desired planting density, seeds are attached to the plant culture medium 800 such as by spraying, or the seedlings are planted to the plant culture medium 800

Finally, the culture liquid is poured to fill the liquid supply pipes 32 through the liquid duct 51 and the branch pipes 52. Since the liquid supply pipes 32 are disposed axially inside the respective outer mesh pipes 31, and have the liquid-absorbing material 33 filled therein, the culture liquid is absorbed by the liquid-absorbing material 33. The excess culture liquid gradually seeps into the plant culture medium 800 in the outer mesh pipes 31 at different levels through the liquid-seeping holes 320, and finally seeps into the plant culture medium 800 around the outer surfaces of the whole outer mesh pipes 31, thereby providing water and nutrition needed by the seeds or seedlings.

During the planting process, the liquid-absorbing material 33 in the liquid supply pipes 32 is saturated with the culture liquid. Therefore, the liquid-absorbing material 33 can provide the plant culture medium 800 of the outer mesh pipes 31 with the needed moisture. In such a manner, the frequency of water supplying operation for the liquid supply pipes 32 can be reduced.

Figure 7:
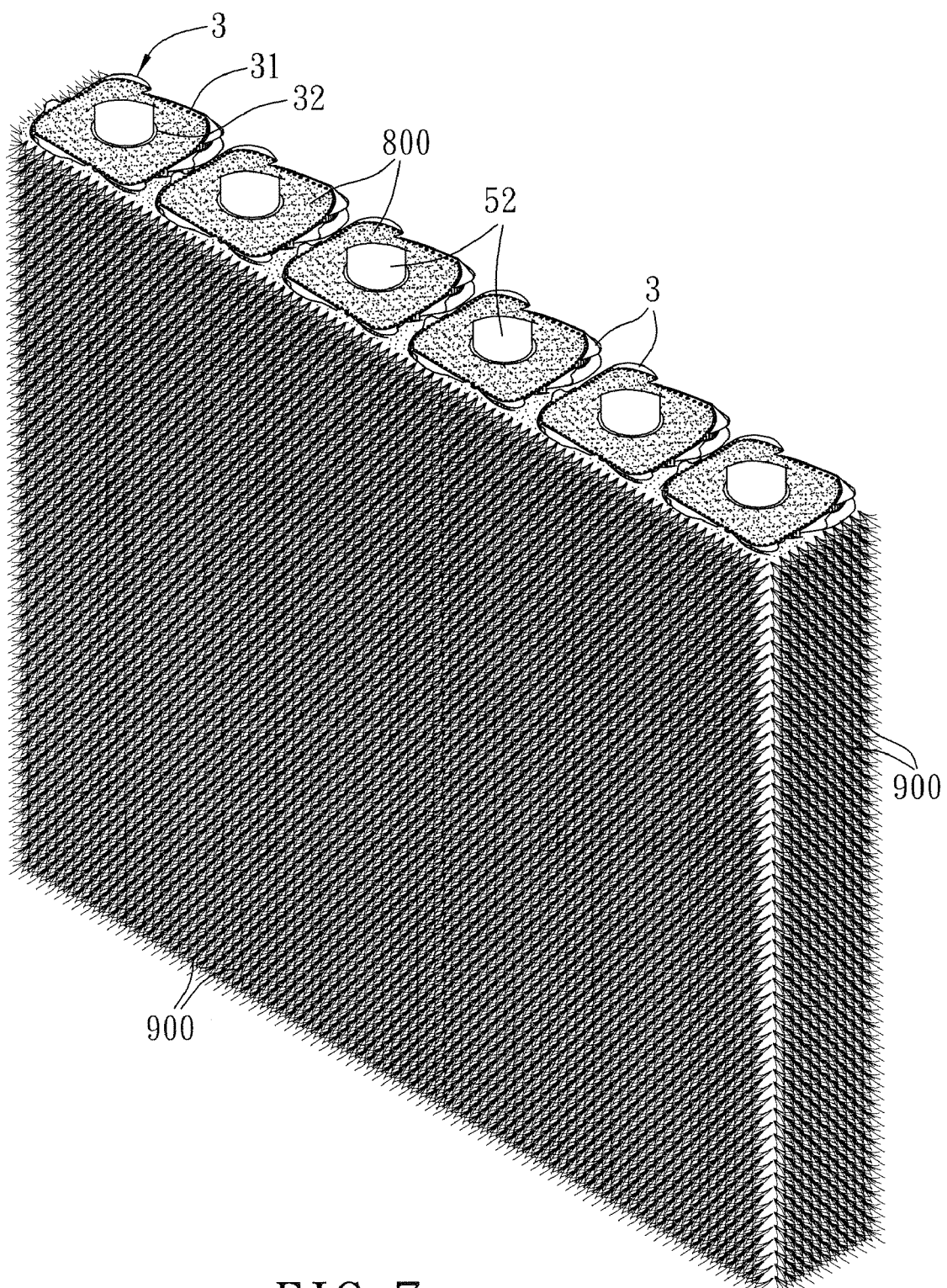
FIG. 7 is a schematic illustration of an upright planting wall constructed using the first embodiment of the present invention.

As shown in FIG. 7, the plants 900 growing on the outer surfaces of the outer mesh pipes 31 form a greening wall with lively leaves or flowers.

Figure 8:
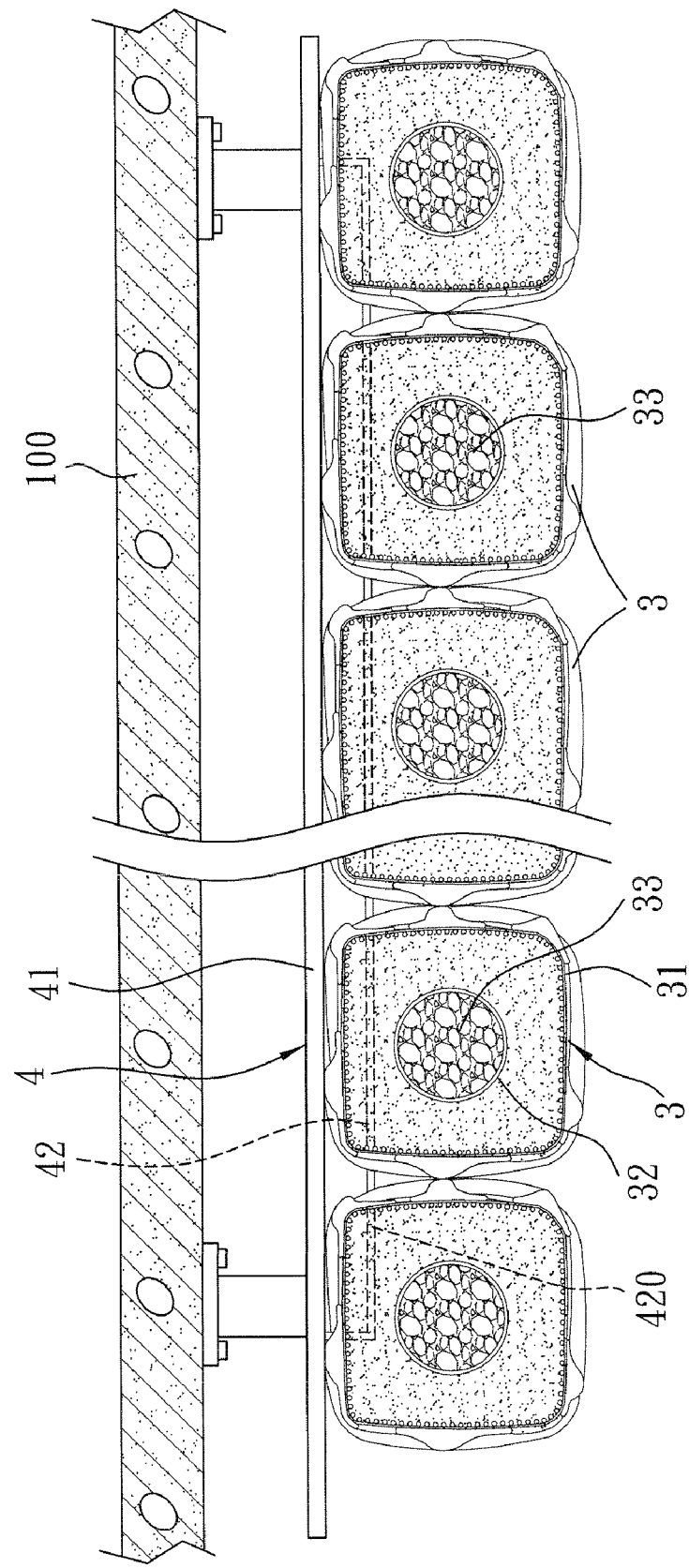
FIG. 8 is a partial top view illustrating the fixing unit of the second embodiment of an upright planting apparatus according to the present invention.

Referring to FIG. 8, the second preferred embodiment of the upright planting apparatus 1 is generally similar to the first preferred embodiment in structure. In the second embodiment, the positioning rod 42 extends through the outer mesh pipes 31 of the mesh pipe units 3 and has two ends that extends out from two outermost ones of the outer mesh pipes 31, respectively, and connected fixedly to the fixation frame 41, thereby positioning the outer mesh pipes 31 to the fixation frame 41. In this embodiment, the fixing units 4 do not have any portion exposed in the front side, left and right lateral sides of the outer mesh pipes 31.

Since the fixing unit 4 may be provided with various arrangements as long as it can fix together the mesh pipe units 3, the fixing unit 4 illustrated in the embodiments should not be imposed as the limitation for implementation of the present invention.

In sum, by the design of the liquid supply pipes 32 and the outer mesh pipes 31 of the mesh pipe units 3, it is convenient to directly form the outer mesh pipes 31 and the liquid supply pipes 32 to appropriate lengths according to the height of the greening wall. Furthermore, by juxtaposing the mesh pipe units 3, a greening wall with a desired width can be constructed easily. Since the height of the entire upright planting apparatus is determined by a single mesh pipe unit, the structural robustness and stability of the upright planting apparatus is significantly improved. The upright planting apparatus is also more convenient for assembly.

The maintenance and care of the plants are also easily performed, and the liquid overflowing drawback of the prior art due to excess amount of water can be effectively reduced. Furthermore, the helical structure of the ribs 313 not only strengthens the structural robustness of the outer mesh pipes 31, but also helps to stabilize and retain the plant culture medium 800 within the groove 310.

While the present invention has been described in connection with what are considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An upright planting apparatus comprising:
   a row of juxtaposed mesh pipe units each configured to extend in an upright direction, and including an outer mesh pipe, and a liquid supply pipe, said outer mesh pipe having an upright tubular wall that is formed with a plurality of mesh holes extending through inner and outer surfaces of said upright tubular wall, and a groove that extends around said outer surface of said upright tubular wall and that communicates fluidly with an interior of said upright tubular wall through said mesh holes, said liquid supply pipe being disposed axially inside said outer mesh pipe and having a plurality of liquid-seeping holes; and
   a fixing unit including:
      a fixation frame disposed at a rear side of said mesh pipe units and elongated in a longitudinal direction which is transverse to the upright direction; and
      a positioning member which has an elongated segment that defines a lengthwise line, and which is coupled with said fixation frame to render the lengthwise line to be oriented in the longitudinal direction when said positioning member is placed in a locking position such that in the locking position, said mesh pipe units are brought into side-by-side contact with each other.

2. The upright planting apparatus of claim 1, wherein said groove extends helically around said outer surface of said upright tubular wall.

3. The upright planting apparatus of claim 2, wherein said outer mesh pipe further has a rib that extends helically around said outer surface and that defines said groove.

4. The upright planting apparatus of claim 1, further includes a liquid duct unit disposed on top of said mesh pipe units and adapted to supply liquid to said liquid supply pipes of said mesh pipe units.

5. The upright planting apparatus of claim 4, wherein said liquid duct unit includes a liquid duct for conveying culture liquid, and a plurality of branch pipes connected to said liquid duct for directing the culture liquid into said liquid supply pipes respectively.

6. The upright planting apparatus of claim 1, wherein each of said liquid supply pipe contains a liquid-absorbing material for absorbing culture liquid.

7. The upright planting apparatus of claim 1, which comprises a pair of said fixing units, one of which fixes together upper portions of said mesh pipe units, and the other one of which fixes together lower portions of said mesh pipe units.

8. The upright planting apparatus of claim 1, wherein said fixation frame abuts against said rear side of said mesh pipe units in the locking position.

9. The upright planting apparatus of claim 8, wherein said positioning member cooperates with said fixation frame to embrace said mesh pipe units.

10. The upright planting apparatus of claim 8, wherein said positioning member extends through said outer mesh pipes of said mesh pipe units and has two ends that extends out from two outermost ones of said outer mesh pipes of said mesh pipe units, respectively, and that are connected fixedly to said fixation frame, thereby positioning said outer mesh pipes to said fixation frame.

\* \* \* \* \*